US007152115B2

(12) United States Patent
Ould Brahim et al.

(10) Patent No.: US 7,152,115 B2
(45) Date of Patent: Dec. 19, 2006

(54) VIRTUAL PRIVATE NETWORKS

(75) Inventors: Hamid H. Ould Brahim, Kanata (CA); Dinesh Mohan, Ottawa (CA); Vasile Radoaca, Burlington, MA (US); Michael Chen, Chapel Hill, NC (US)

(73) Assignee: Nortel Networks Limited (CA)

( * ) Notice: Subject to any disclaimer, the term of this patent is extended or adjusted under 35 U.S.C. 154(b) by 715 days.

(21) Appl. No.: 10/191,660

(22) Filed: Jul. 9, 2002

(65) Prior Publication Data

US 2003/0018820 A1 Jan. 23, 2003

Related U.S. Application Data

(60) Provisional application No. 60/304,970, filed on Jul. 12, 2001.

(51) Int. Cl.
*G06F 15/173* (2006.01)
*H04L 12/66* (2006.01)
*G01R 31/08* (2006.01)

(52) U.S. Cl. ............... 709/238; 709/239; 709/240; 709/241; 709/242; 709/243; 370/216; 370/352; 370/353; 370/354

(58) Field of Classification Search ........ 709/238–243; 370/216, 352–354
See application file for complete search history.

(56) References Cited

U.S. PATENT DOCUMENTS

| | | | | |
|---|---|---|---|---|
| 6,337,863 B1* | 1/2002 | Nair et al. | ............. | 370/395.53 |
| 6,426,954 B1* | 7/2002 | Krause | ................... | 370/395.53 |
| 6,608,812 B1* | 8/2003 | Wils et al. | .................. | 370/217 |
| 6,614,792 B1* | 9/2003 | Pazy et al. | ............. | 370/395.53 |
| 6,639,901 B1* | 10/2003 | Katzri et al. | ................. | 370/255 |
| 6,671,279 B1* | 12/2003 | Mangin et al. | .......... | 370/395.5 |
| 6,714,549 B1* | 3/2004 | Phaltankar | ................... | 370/397 |
| 6,751,729 B1* | 6/2004 | Giniger et al. | .............. | 713/153 |
| 6,771,662 B1* | 8/2004 | Miki et al. | ................... | 370/469 |
| 6,778,498 B1* | 8/2004 | McDysan | ................... | 370/231 |
| 6,810,008 B1* | 10/2004 | Eng et al. | ................... | 370/216 |
| 6,813,644 B1* | 11/2004 | Jamieson et al. | ........... | 709/242 |
| 6,870,813 B1* | 3/2005 | Raza et al. | .................. | 370/238 |

(Continued)

OTHER PUBLICATIONS

Paul Knight et al, "Logical PE Auto-Discovery Mechanism", Internet Engineering Task Force, Nov. 2001, 11 pages.

(Continued)

*Primary Examiner*—Khanh Dinh
*Assistant Examiner*—Van Kim T. Nguyen
(74) *Attorney, Agent, or Firm*—McGuinness & Manaras LLP

(57) ABSTRACT

A network can be organized for providing virtual private network services to customers into two regions. A network core for providing layer 2 transport and an associated number of logical provider edges. Each logical provider edge is partitioned into first and second portions. The first portion provides virtual private network services to customers. The second portion works with the core network to communicate with any other logical provider edge within the network. The first portion designated as the PE-Edge includes a group of functions such as a function for configuring optical Ethernet layer 2 virtual private network service, a function for service labeling, a function for ingress traffic management, and a function for information exchange between local VPN and core VPN. The second portion designated as PE-Core includes a group of functions such as a function for distributing service labels, a function for distributing information on transport tunnels, a function for information exchange between local and core VPN. Within the logical provider edge or Logical PE, the PE-Edge and PE-Core communicate via a layer 2 network.

19 Claims, 3 Drawing Sheets

U.S. PATENT DOCUMENTS

| | | | |
|---|---|---|---|
| 2001/0005381 A1* | 6/2001 | Sugiyama | 370/466 |
| 2001/0044842 A1* | 11/2001 | Kawakami | 709/223 |
| 2001/0050914 A1* | 12/2001 | Akahane et al. | 370/382 |
| 2002/0110087 A1* | 8/2002 | Zelig et al. | 370/236 |
| 2002/0191250 A1* | 12/2002 | Graves et al. | 359/128 |
| 2004/0202171 A1* | 10/2004 | Hama | 370/395.1 |

OTHER PUBLICATIONS

Hamid Ould-Brahim et al., "Network based IP VPN Architecture using Virtual Routers", Internet Engineering Task Force, Nov. 2001, 19 pages.

K. Kompella et al., "Layer 2 VPNs Over Tunnels", Internet Engineering Task Force, Nov. 2001, 31 pages.

Luca Martini et al., "Encapsulation Methods for Transport of Layer 2 Frames Over IP and MPLS Networks", Internet Engineering Task Force, Nov. 2001, 18 pages.

Luca Martini et al., "Transport of Layer 2 Frames Over MPLS", Internet Engineering Task Force, Nov. 2001, 19 pages.

Hamid-Ould-Brahim et al., "BGP/GMPLS Optical/TDM VPNs", Internet Engineering Task Force, Nov. 2001, 21 pages.

Dinesh Mohan et al., "VPLS/LPE L2VPNs: Virtual Private LAN Services using Logical PE Architecture", Internet Engineering Task Force, Mar. 2002, 23 pages.

B. Fox et al., "Virtual Private Networks Identifier", The Internet Society, Sep. 1999, 7 pages.

B. Gleeson et al., "A Framework for IP Based Virtual Private Networks", The Internet Society, Feb. 2000, 65 pages.

* cited by examiner

VIRTUAL PRIVATE NETWORKS

FIELD OF THE INVENTION

The present invention relates to virtual private networks, and is particularly concerned with layer 2 Ethernet IP/MPLS based virtual private networks.

BACKGROUND OF THE INVENTION

Ethernet has emerged as the technology of choice for local area networks (LAN). With speeds of 10 Mbps, 100 Mbps, 1 Gbps and soon 10 Gbps, Ethernet capacity has grown to meet the need for increased network capacities. Price, performance and simplicity have been the network values that Ethernet technology has offered. These have also resulted in the conception of Optical Ethernet networks where optical wavelengths are used as a backbone to carry encapsulated Ethernet packets. This marries the ubiquitous Ethernet with the enormous bandwidth of optical networks. Despite the inherent elegance of this conceptual network, actual implementation of such networks must devise physical and or logical arrangements to insure optimal performance, scalability, and operability.

Traditionally any to any connectivity offered in Virtual Private Networks between multiple customer sites is provided through provider provisioned network arrangement where customer sites are connected to Provider Edge devices. Such Provider Edge devices together emulate a layer 2 virtual bridge as specified by IEEE802.1D. While such arrangement works fine for a small sized VPLS service, such arrangement potentially creates scalability across signaling and data path, flexibility and maintenance issues. Other issues include limiting of service disruptions due to invalid/corrupt MAC addresses and easing the provisioning and troubleshooting.

SUMMARY OF THE INVENTION

An object of the present invention is to provide an improved virtual private network.

Accordingly the present invention provides a logical provider edge (LPE).

The logical provider edge (LPE) provides a way to organize network components in a hierarchy in order to deliver virtual private LAN segment (VPLS) service. A VPLS is a type of virtual private network in which packets forwarded between VPN sites are Ethernet packets. VPLS service is also known as transparent LAN service (TLS).

Advantages of the present invention include reducing signaling overhead, eliminating MAC address management on core nodes, decoupling the core L2VPN solution from the distribution model, decoupling the VPN constructs with the VPLS constructs (membership), supporting broadcast domains between all types of PE, allowing PE—PE communication for all types of PE, providing for scaling the number of customer attached PE-ports without impacting the core network (management), working with or without MPLS on the decoupled domain, allowing addition/deletion/modification of PE-Edge without involving configuration on both PE-Edge and PE-Core, and accommodating both Martini and MPLS-in-IP encapsulations.

In accordance with an aspect of the present invention there is provided a network organized for providing virtual private network services to customers comprising a network core for providing layer 2 transport and a logical provider edge partitioned into first and second portions, the first portion for providing virtual private network services to customers, the second portion for working with the core network to communicate with any other logical provider edge within the network.

In accordance with an aspect of the present invention there is provided a method of organizing a network for providing virtual private network services to customers comprising providing layer 2 transport within a network core and for each provider edge network, defining a logical provider edge partitioned into first and second portions, the first portion providing virtual private network services to customers, the second portion working with the core network to communicate with any other logical provider edge within the network.

A network organized for providing virtual private network services to customers comprising a logical provider edge partitioned into first and second portions, the first portion for providing virtual private network services to customers, the second portion for working with the core network to communicate with any other logical provider edge within the network.

Advantages of the present invention include reducing signaling overhead, eliminating MAC address management on core nodes, decoupling the core L2VPN solution from the distribution model, decoupling the VPN constructs with the VPLS (membership), supporting broadcast domains between all types of PE, allowing PE—PE communication for all types of PE, providing for scaling the number of customer attached PE-ports without impacting the core network (management), working with or without MPLS on the decoupled domain, allowing addition/deletion/modification of PE-Edge without involving configuration on both PE-Edge and PE-Core, and accommodating both Martini and MPLS-in-IP encapsulations.

BRIEF DESCRIPTION OF THE DRAWINGS

The present invention will be further understood from the following detailed description with reference to the drawings in which.

DETAILED DESCRIPTION OF THE PREFERRED EMBODIMENT

Figure 1:
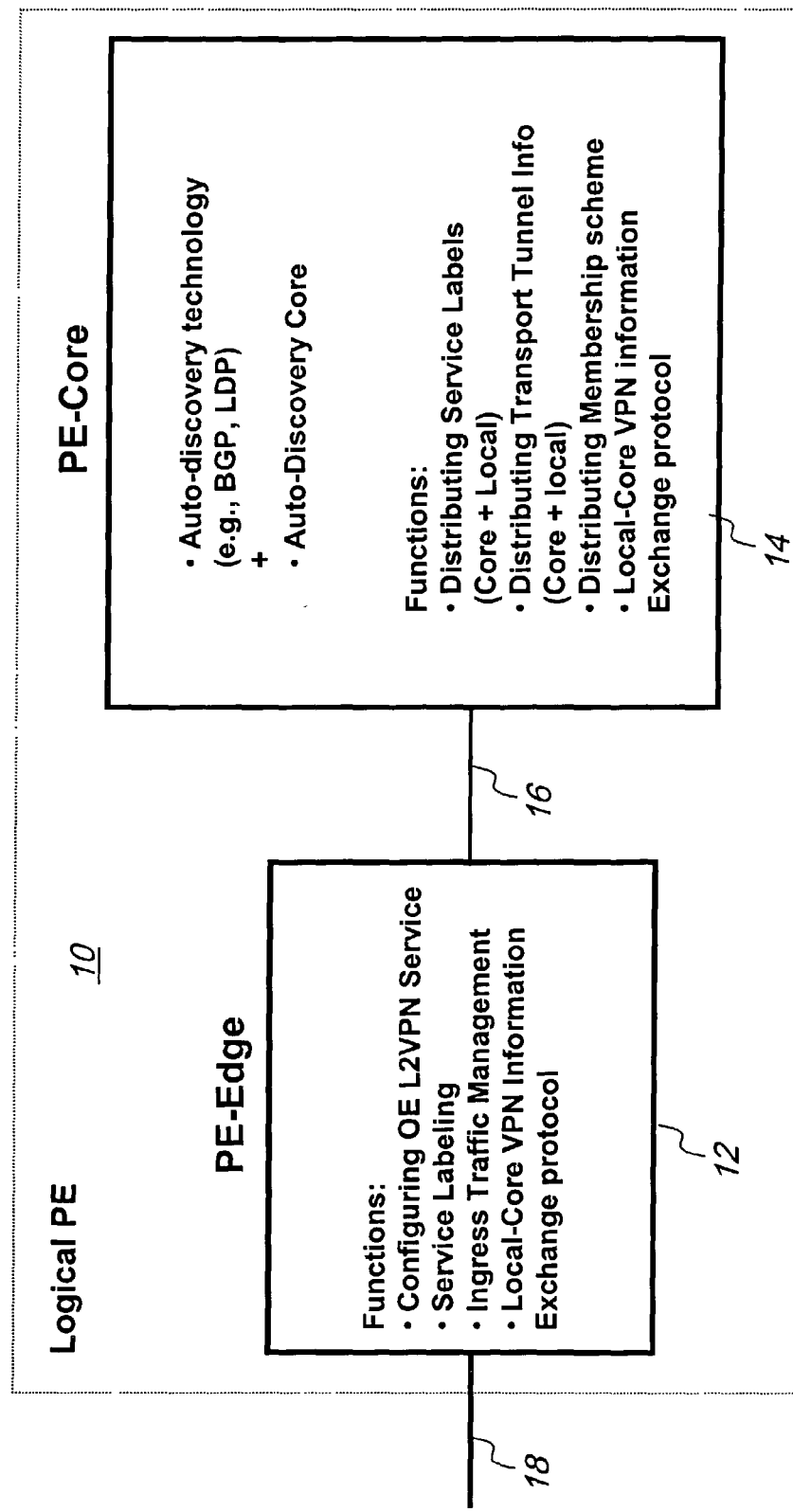
FIG. 1 illustrates a logical provider edge for a Ethernet network in accordance with an embodiment of the present invention.

Referring to FIG. 1 there is illustrated, a logical provider edge in accordance with an embodiment of the present invention. The logical provider edge (LPE) provides a way to organize network components in a hierarchy in order to deliver virtual private LAN segment (VPLS) service. A VPLS is a type of virtual private network in which packets forwarded between VPN sites are Ethernet packets. VPLS service is also known as transparent LAN service (TLS). The logical provider edge 10 includes provider edge device functions 12 and provider edge (PE) core device functions 14 interconnected by a layer 2 (L2) network 16 for providing services at a link 18. The provider edge (PE) edge device functions include:

- Configuring Optical Ethernet layer 2 Virtual Private Network (OE L2 VPN) service;
- Service labeling;
- Ingress traffic management;
- Local-core VPN information exchange protocol The provider edge (PE) device functions include:
- auto-discovery technology
- auto-discovery core
- distribution service labels (core & local)
- distribution transport tunnel info (core & local)
- distribution membership scheme
- local-core VPN information exchange protocol The logical PE 10 combines the functionality of the PE edge and PE core devices. The Logical PE is a logical view layered on top of the physical network devices. This provides several advantages as will be discussed herein below.

Figure 2:
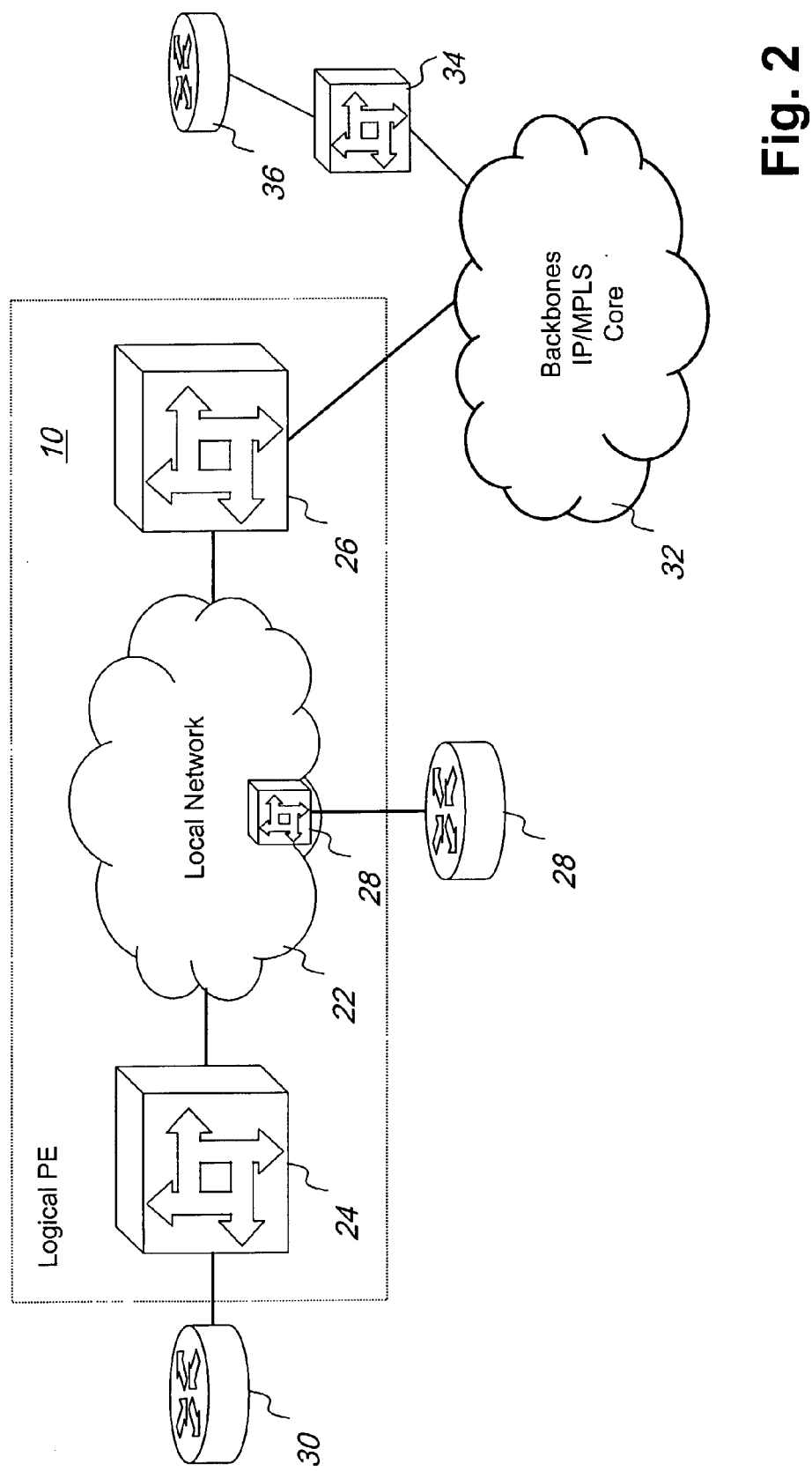
FIG. 2 illustrates a network including a logical provider edge in accordance with an embodiment of the present invention.

Referring to FIG. 2 there is illustrated a network including a logical provider edge in accordance with an embodiment of the present invention. The exemplary logical provider edge (Logical PE) 10 of FIG. 2 includes a local network 22 and first and second provider edge devices 24 and 26. The local network 22 includes a third provider edge device 28. Further examples of implementations of logical provider edges are shown in FIG. 3

Figure 3:
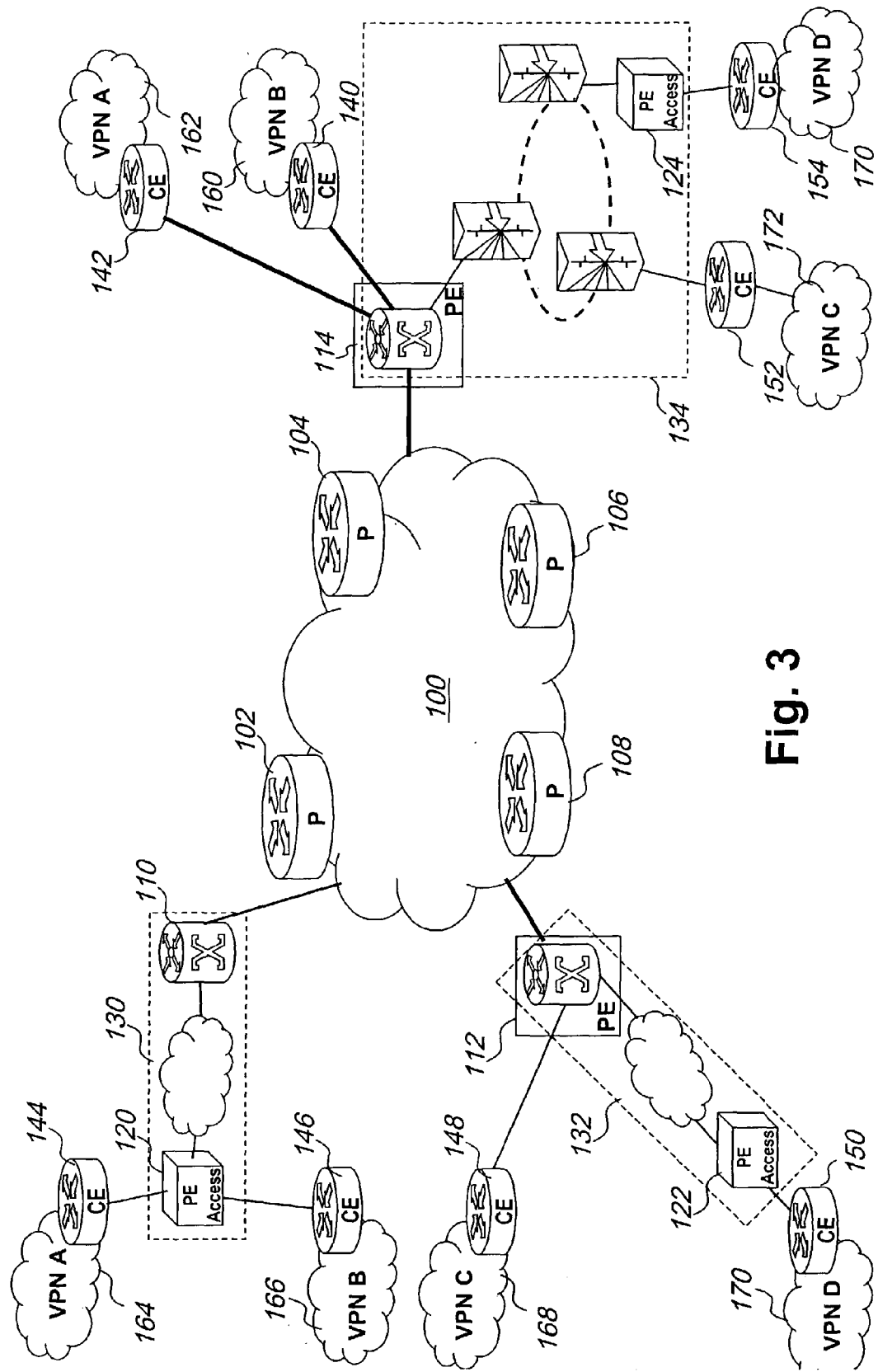
FIG. 3 illustrates a network reference model including a plurality of instances of logical PE in accordance with a further embodiment of the present invention.

Referring to FIG. 3 there is provided a network reference model including a plurality of instances of logical PE in accordance with a further embodiment of the present invention. The network reference model includes IP, MPLS backbones as represented by action 100 and a plurality of provider internal devices 102, 104, 106, 108. Connected to the backbones is a plurality of provider edges (PE) provider edge core devices as represented by devices 110, 112, and 114. The PE edge/core devices 110, 112 and 114 are connected to provide edge access devices 120, 122, and 124, respectively. Logical PE are defined for each of the PE core devices 110, 112, and 114 as local PE 130, 132 and 134, respectively. As can be seen from the network reference model. Coupled to each logical PE are customer edge (CE) devices. Customer edge (CE) devices 140 and 142 are shown coupled directly to PE core device 114. Customer edge (CE) devices 144 and 146 are coupled to the logical PE 130. Customer edge (CE) devices 148 and 150 are coupled to the logical PE 132. Customer edge (CE) devices 152 and 154 are coupled to the logical PE 134.

Each CE device is shown coupled to a virtual private network. Hence CE devices 140 and 142 are coupled to instances of VPNB 160 and VPNA 162, respectively. CE devices 144 and 146 are coupled to instances of VPNA 164 and VPNB 166, respectively. CE devices 148 and 150 are coupled to instances of VPNC 168 and VPND 170, respectively. CE devices 152 and 154 are coupled to instances of VPNC 172 and VPND 172, respectively.

As can be appreciated from the network reference model, the actual form of the access network between the client edge device and the provider edge core is transparent once logical PEs are defined.

As a consequence, CE devices directly connected to the PE core, for example CE devices 140 and 142 are provisioned at the same point (the PE core 114) as CE devices 152 and 154. Hence, there is a single point of provisioning. Interworking of the logical provider edge with the IP/MPLS backbones 100 enhances scalability and resiliency of optical Ethernet implementations incorporating this use of logical PE. Also optical Ethernet L2 VPN services as defined by the Internet Engineering Task Force (IETF). Finally, use of logical PE provides flexibility in the L2 transport network.

The logical PE provides the following advantages:
- reduces signaling overhead
- eliminates MAC address management on core nodes
- decouples the core L2VPN solution from the distribution model
- decouples the VPN constructs with the VPLS (membership)
- supports broadcast domains between all types of PE
- allows PE—PE communication for all types of PE
- provides scaling the number of customer attached PE-ports without impacting the core network (management)
- works with or without MPLS on the decoupled domain
- addition/deletion/modification of PE-Edge does not involve configuration on both PE-Edge and PE-Core
- accommodates both Martini and MPLS-in-IP encapsulations Reduces Signaling Overhead Rather than requiring a full mesh of uni-directional label switched path tunnels across the MPLS backbone between provider edge devices, the logical provider edge allows all traffic between two such entities to be assigned to a pair of uni-directional LSP tunnels across the backbone.

Eliminates MAC Address Management on Core Nodes

In a typical network, MAC addresses for all customers must be known by the core nodes in order to effect switching of the Ethernet packets within the network. The logical provider edge effectively partitions addressing between a customer facing function and a backbone facing function. Hence only the customer facing function, resident in the PE access, needs to know the customer MAC address, while the backbone facing function, resident in the PE core does not. Hence the PE core does not need to be updated every time a customer MAC is added.

Decouples the Core L2VPN Solution from the Distribution Model

The logical provider edge functional partition also provides a decoupling of the core layer 2 virtual private network (L2VPN) solution used from the PE core nodes inward across the backbone networks from the distribution model used in the access side.

Decouples the VPN Constructs with the VPLS (membership)

The logical provider edge functional partition also decouples the VPN constructs used within the VPLS. For example from the PE core nodes inward VPN-ids, Route-Target, RD and GID may be used, while outwardly any preferred membership scheme can be applied because it terminates within the LPE.

Supports Broadcast Domains Between all Types of PE

Within a logical PE there may be different types of provider edge devices. The logical provider edge masks those differences and hence allows broadcast domains between all types of PE.

Allows PE—PE Communication for All Types of PE addition/deletion/modification of PE-Edge does not involve configuration on both PE-Edge and PE-Core Similarly, the logical provider edge masks also allows direct communication between all types of PE.

Provides Scaling the Number of Customer Attached PE-orts without Impacting the Core Network (management)

The logical provider edge functional partition also provides for scaling the number of customer attached PE-ports without impacting the core network.

Works with or without MPLS on the Decoupled Domain

The logical provider edge functional partition also works with or without MPLS on the decoupled domain.

Addition/Deletion/Modification of PE-Edge does not Involve Configuration on Both PE-Edge and PE-Core The logical provider edge functional partition also provides for addition/deletion/modification of PE-Edge without involving configuration on both PE-Edge and PE-Core.

Accommodates Both Martini and MPLS-in-IP Encapsulations

The logical provider edge functional partition accommodates both Martini and MPLS-in-IP encapsulations. The inherent flexibility provided by the LPE facilitates the use of known encapsulation schemes.

Numerous other modifications, variations and adaptations may be made to the particular embodiments of the invention described above without departing from the scope of the invention as defined in the claims.

What is claimed is:

1. A network organized for providing virtual private network services to customers in first and second local networks, with the network comprising:
    a core network for providing layer 2 transport;
    a first logical provider edge including first and second physical devices, the first physical device providing virtual private network services access to customers via the first local network, the second physical device working with the core network, wherein the second physical device includes a function for distributing information on transport tunnels; and
    a second logical provider edge including third and fourth physical devices, the third physical device providing virtual private network service access to customers via the second local network, the fourth physical device working with the core network and including a function for distributing information on transport tunnels,
    wherein the first and second logical provider edges are interconnected via the core network, and wherein at least a portion of Ethernet packet traffic communicated between the first and second logical provider edges is transported via a pair of uni-directional tunnels.

2. A network as claimed in claim 1 wherein the first and third physical devices each include a function for configuring layer 2 virtual private network service.

3. A network as claimed in claim 1 wherein the first and third physical devices each include a function for service labeling.

4. A network as claimed in claim 1 wherein the first and third physical devices each include a function for ingress traffic management.

5. A network as claimed in claim 1 wherein the first and third physical devices each include a function for information exchange between local VPN and core VPN.

6. A network as claimed in claim 1 wherein the second and fourth physical devices each include a function for distributing information on transport tunnels.

7. A network as claimed in claim 1 wherein the second and fourth physical devices each include a function for information exchange between local VPN and core VPN.

8. A network as claimed in claim 1 wherein the first physical device and the second physical device communicate via a layer 2 network.

9. A method of organizing a network for providing virtual private network services to customers, the method comprising:
    providing layer 2 transport within a core of the network;
    defining a first logical provider edge including a first physical device for providing virtual private network service access to customers in a first local network, and a second physical device for working with the core of the network and distributing information on transport tunnels,
    defining a second logical provider edge including a third physical device for providing virtual private network service access to customers in a second local network, and a fourth physical device for working with the core of the network and distributing information on transport tunnels,
    wherein the first and second logical provider edges are interconnect via the core network; and
    communicating at least some Ethernet packet traffic between the first and second logical provider edges via a pair of uni-directional tunnels.

10. A method of claim 9 including the further steps of configuring layer 2 virtual private network service by the first and third physical devices.

11. A method of claim 9 including the further steps of providing service labeling by the first and third physical devices.

12. A method as claimed in claim 9 including the further steps of managing ingress traffic by the first and third physical devices.

13. A method as claimed in claim 9 including the further steps of exchanging information between local VPN and core VPN by the first and third physical devices.

14. A method as claimed in claim 9 including the further steps of distributing service labels by the second and fourth physical devices.

15. A method as claimed in claim 9 including the further steps of exchanging information between local VPN and core VPN by the second and fourth physical devices.

16. A network organized for providing virtual private network services to customers comprising:
    a first logical provider edge including first and second physical provider edge devices, the first physical device operative for providing virtual private network service access to customers of a first local network, the second physical device operative for working with the core network; and
    a second logical provider edge including third and fourth physical provider edge devices, the third physical device operative for providing virtual private network service access to customers of a second local network, the fourth physical device operative for working with the core network;
    wherein the first and second logical provider edges are interconnect via the core network, and wherein at least some Ethernet packet traffic from the local network communicated between the first and second logical provider edges is transported via a pair of uni-directional tunnels;
    wherein the first and third physical devices each include a function for configuring optical Ethernet layer 2 virtual private network service, a function for service labeling, a function for ingress traffic management, and a function for information exchange between local VPN and core VPN; and wherein the second and fourth devices each include a function for distributing service labels, a function for distributing information on transport tunnels, and a function for information exchange between local VPN and core VPN.

17. A network as claimed in claim 1 wherein the first and second physical devices are capable of connecting through a local virtual private network while said core network supports a core virtual private network.

18. A method as claimed in claim 9 wherein the first and second physical devices can connect through a local virtual private network while said core network supports a core virtual private network.

19. A network as claimed in claim 16 wherein the second physical device includes: a module for configuring layer 2 virtual private network service, a module for distributing service labels, a module for distributing information on transport tunnels, and a module for information exchange between local and core VPN.

* * * * *